(12) United States Patent
Hebrink et al.

(10) Patent No.: US 6,673,425 B1
(45) Date of Patent: Jan. 6, 2004

(54) METHOD AND MATERIALS FOR PREVENTING WARPING IN OPTICAL FILMS

(75) Inventors: Timothy J. Hebrink, Oakdale, MN (US); Andrew J. Ouderkirk, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 143 days.

(21) Appl. No.: 09/698,717

(22) Filed: Oct. 27, 2000

(51) Int. Cl.[7] .................. B32B 27/08; B32B 27/30; B32B 27/36; B32B 31/30; B32B 33/00
(52) U.S. Cl. ............ 428/212; 428/141; 428/156; 428/172; 428/480; 428/483; 428/910; 156/244.11; 156/244.24; 156/297; 156/299; 264/173.11; 264/173.12; 264/173.15; 264/173.16; 264/171.13; 264/171.23; 264/509
(58) Field of Search .................. 428/480, 483, 428/212, 216, 910, 141, 156, 172; 156/244.11, 297, 244.24, 299; 264/173.11, 173.12, 173.15, 173.16, 171.13, 171.23, 509; 359/586, 577, 580

(56) References Cited

U.S. PATENT DOCUMENTS

| 4,264,664 | A | * | 4/1981 | Kunz | 428/142 |
| 5,262,894 | A | * | 11/1993 | Wheatley et al. | 359/586 |
| 5,339,198 | A | * | 8/1994 | Wheatly et al. | 359/359 |
| 5,486,949 | A | * | 1/1996 | Schrenk et al. | 156/244.11 |
| 5,552,927 | A | * | 9/1996 | Wheatly et al. | 359/359 |
| 5,612,820 | A | * | 3/1997 | Schrenk et al. | 156/229 |
| 5,882,774 | A | * | 3/1999 | Jonza et al. | 359/577 |
| 6,352,761 | B1 | * | 3/2002 | Hebrink et al. | 359/485 |
| 6,368,699 | B1 | * | 4/2002 | Gilbert et al. | 359/15 |

FOREIGN PATENT DOCUMENTS

| WO | WO 97/01440 | * | 1/1997 |
| WO | WO 99/36257 | * | 7/1999 |

* cited by examiner

Primary Examiner—Vivian Chen
(74) Attorney, Agent, or Firm—Bruce E. Black

(57) ABSTRACT

A multilayer optical body having improved dimensional stability is disclosed. The optical body includes an optical film, such as an oriented multilayer optical film, and a dimensionally stable layer, such as a transparent polycarbonate layer. In addition, in specific implementations, the invention includes an intermediate layer between the optical film and the dimensionally stable layer. Methods of making the optical body are also disclosed.

66 Claims, 2 Drawing Sheets

METHOD AND MATERIALS FOR PREVENTING WARPING IN OPTICAL FILMS

FIELD OF THE INVENTION

The present invention relates to optical bodies and methods of making optical bodies. More specifically, the invention is directed to optical bodies that resist warping when cycled through temperature changes, and to methods of making such optical bodies.

BACKGROUND

Multilayer polymeric optical films are widely used for various purposes, including as mirrors and polarizers. These films often have extremely high reflectivity, while being lightweight and resistant to breakage. Thus, the films are well suited for use as reflectors and polarizers in compact electronic displays, including as liquid crystal displays (LCDs) placed in mobile telephones, personal data assistants, and portable computers.

Although polymeric optical films can have favorable optical and physical properties, one limitation with some such films is that they show significant dimensional instability when exposed to fluctuations in temperature—even the temperature fluctuations experienced in normal use. This dimensional instability can result in formation of wrinkles in the film as it expands and contracts. Such dimensional instability is particularly common when temperatures approach or exceed approximately 80° C. At these temperatures the films fail to maintain a smooth, flat surface, and form wrinkles as a result of warping. This warping is often particularly pronounced in larger films, such as those used in desktop LCD monitors and notebook computers. Warping is also observed when the film is cycled to high temperature and high humidity conditions, such as conditions of 60° C. and 70 percent relative humidity.

Thus, a need exists for improved optical films that have favorable optical properties, but which limit warping caused by dimensional instability.

SUMMARY OF THE INVENTION

The present invention is directed to multilayer optical bodies that resist warping when exposed to temperature fluctuations. In particular, the invention is directed to multilayer optical bodies that contain an optical film joined to one or more dimensionally stable layers. The dimensionally stable layers support the optical film such that the composite multilayer optical body resists warping after exposure to temperature fluctuations, while maintaining the light weight, durability, and flexibility of the optical film. The invention is also directed to methods of making optical bodies and to displays (such as LCDs) containing the optical bodies.

In addition to containing an optical film and one or more dimensionally stable layers, the optical body can include one or more additional layers. These additional layers can be placed between the optical film and the dimensionally stable layer, and can include an extrudable thermoplastic polymer that secures the optical film and dimensionally stable layers together.

The optical film used in the mutlilayer optical body includes, for example, polarizing reflectors and mirror films. The optical film is typically an oriented optical film, and is itself typically composed of multiple layers. In certain embodiments the optical film includes at least one layer containing polyester, such as polymers or copolymers of poly(ethylene naphthalate) (PEN and COPEN) and polymers or copolymers of polyethylene terepthalate (PET and CoPET).

The dimensionally stable layer adds sufficient dimensional stability to the composite multilayer body such that it does not substantially warp when exposed to changes in temperature. The dimensionally stable layer is typically a polymeric material exhibiting a glass transition temperature ($T_g$) from 80 to 250° C., more typically from 100 to 200° C. Suitable dimensionally stable layers can include polycarbonate or miscible blends of polycarbonate and PEN, COPEN, PET, and CoPET. Additional suitable dimensionally stable layers contain polystyrene or polystyrene copolymers, including styrene acrylonitrile, acrylonitrile butadiene styrene, and styrene methyl methacrylate. High $T_g$ nylons and polyetherimide may also be used for to add dimensional stability.

The optional additional layer or layers can serve various functions, and typically serve to promote adhesion of the optical film to the dimensionally stable layer. The additional layers can be an intermediate layer, are typically a polymeric composition, and are preferably thermally stable in the melt phase at temperatures above 250° C. Thus, such intermediate layers do not typically show substantial degradation during extrusion at temperatures greater than 250° C. In specific implementations the intermediate layer is transparent or substantially transparent. In some implementations, the intermediate layer can contain particles of differing refractive index to improve diffusion.

The optical bodies of the present invention can be formed by methods in which the dimensionally stable layer is co-extruded or extrusion coated onto the optical film. When the optical film is an oriented optical film, it can be oriented by stretching either before or after being joined to the dimensionally stable layer. Additional layers, when present, are also typically extrusion-coated onto the optical film. The individual layers should have sufficient thermal stability to undergo co-extrusion or extrusion coating at elevated temperatures.

BRIEF DESCRIPTION OF THE DRAWINGS

The invention will be further explained with reference to the drawings.

DETAILED DESCRIPTION OF THE INVENTION

As stated above, the present invention provides an optical body that resists warping. Such warping occurs in some optical films, particularly polymeric optical films, including oriented polymeric optical films. The optical body contains an optical film, one or more dimensionally stable layers, and one or more optional additional layers. The optional additional layers can be an intermediate binding layer between the optical film and dimensionally stable layer.

Figure 1:
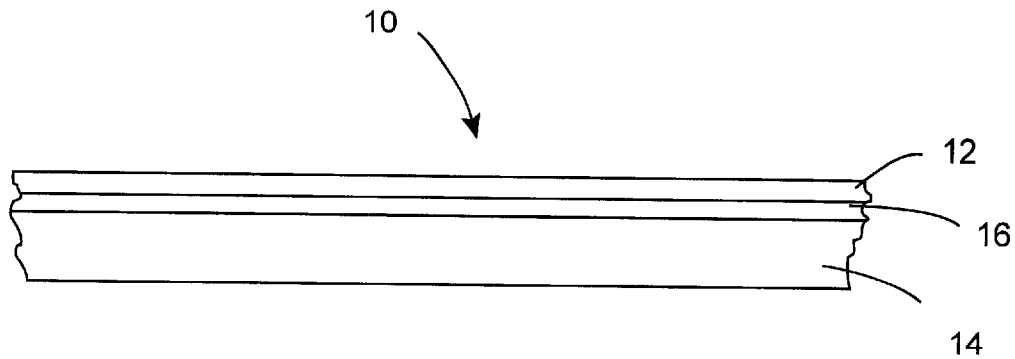
FIG. 1 is a side elevational view of an optical body constructed and arranged in accordance with a first implementation of the invention, showing an optical body with an optical film, a dimensionally stable layer, and an intermediate layer.
Figure 2:
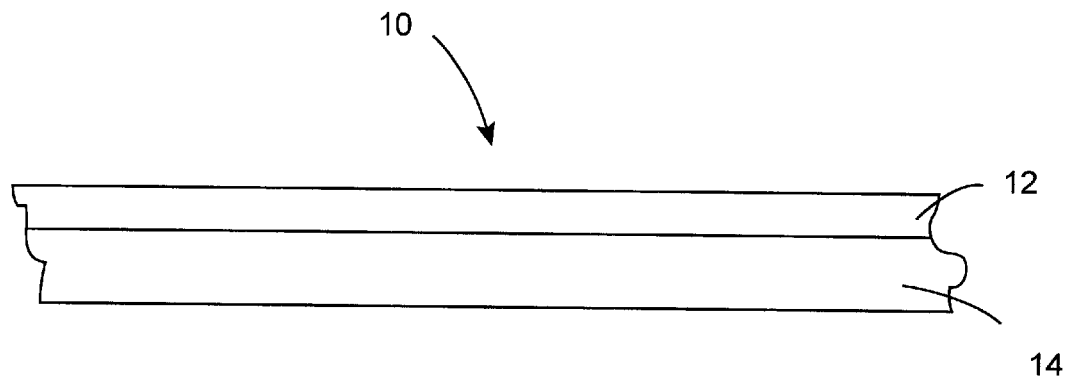
FIG. 2 is a side elevational view of an optical body constructed and arranged in accordance with a second implementation of the invention, showing an optical body without an intermediate layer.
Figure 3:
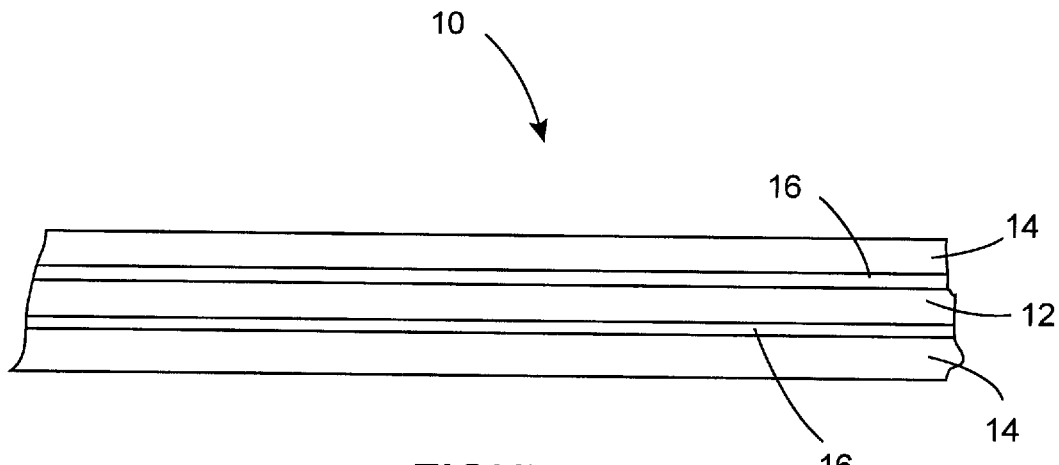
FIG. 3 is a side elevational view of an optical body constructed and arranged in accordance with a third implementation of the invention, showing an optical body with two dimensionally stable layers.

Reference is now made to FIGS. 1 through 3, which show various general embodiments of the invention. In FIG. 1, optical body 10 includes an optical film 12, a dimensionally stable layer 14, and an intermediate layer 16. The three layers in the example depicted in FIG. 1 show the thickest layer being the dimensionally stable layer 14, followed in thickness by the optical film 12 and the intermediate layer 16. However, the layers can be constructed to have different relative thicknesses than those shown in FIG. 1. Thus, the optical film 12 can optionally be of greater thickness than the dimensionally stable layer 14.

In FIG. 2, optical body 10 includes an optical film 12 and a dimensionally stable layer 14, but does not further include a discrete intermediate layer. FIG. 3 shows a further implementation of the invention of an optical body 10 with one optical film 12 and two dimensionally stable layers 14. Optical body 10 also includes two intermediate layers 16. Other implementations of the invention, not shown in the figures, include optical bodies with two dimensionally stable layers but without intermediate layers.

These various components, along with methods of making the optical body of the invention, are described below.

A. Optical Film

Various optical films are suitable for use with the present invention. In particular, polymeric optical films, including oriented polymeric optical films, are suitable for use with the invention because they are prone to warpage from exposure to temperature fluctuations.

The optical films include multilayer optical films, including multilayer films having a high reflectivity over a wide bandwidth, and continuous/disperse phase optical films. The optical films include polarizers and mirrors. In general, multilayer optical films are specular reflectors and continuous/disperse phase optical films are diffuse reflectors, although these characterizations are not universal (see, e.g., the diffuse multilayer reflective polarizers described in U.S. Pat. No. 5,867,316). These optical films are merely illustrative and are not meant to be an exhaustive list of suitable polymeric optical films useful with the present invention.

Both multilayer reflective optical films and continuous/disperse phase reflective optical films rely on index of refraction differences between at least two different materials (preferably polymers) to selectively reflect light of at least one polarization orientation. Suitable diffuse reflective polarizers include the continuous/disperse phase optical films described in U.S. Pat. No. 5,825,543 entitled "Diffusely Reflecting Polarizing Element Including a First Birefringent Phase and a Second Phase, incorporated herein by reference, as well as the diffusely reflecting optical films described in U.S. Pat. No. 5,867,316 entitled "Multilayer Film Having a Continuous and Disperse Phase, incorporated herein by reference.

Optical films that are especially suitable for use in the present invention are multilayer reflective films such as those described in, for example, U.S. Pat. No. 5,882,774 entitled "Optical Film" and in PCT Publication Nos. WO95/17303; WO95/17691; WO95/17692; WO95/17699; WO96/19347; and WO99/36262, all of which are incorporated herein by reference. The film is preferably a multilayer stack of polymer layers with a Brewster angle (the angle at which reflectance of p polarized light goes to zero) that is very large or nonexistent. The film is made into a multilayer mirror or polarizer whose reflectivity for p polarized light decreases slowly with angle of incidence, is independent of angle of incidence, or increases with angle of incidence away from the normal. This multilayered optical film has high reflectivity (for both s and p polarized light) for any incident direction. One commercially available form of a multilayer reflective polarizer is marketed as Dual Brightness Enhanced Film (DBEF) by 3M, St. Paul, Minn. Multilayer reflective optical films are used herein as an example to illustrate optical film structures and methods of making and using the optical films of the invention. The structures, methods, and techniques described herein can be adapted and applied to other types of suitable optical films.

A suitable multilayer reflective optical film can be made by alternating (e.g., interleaving) uniaxially- or biaxially-oriented birefringent first optical layers with second optical layers. In some embodiments, the second optical layers have an isotropic index of refraction that is approximately equal to one of the in-plane indices of the oriented layer. The interface between the two optical layers forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers. Generally, multilayer optical films have about 2 to 5000 optical layers, typically about 25 to 2000 optical layers, and often about 50 to 1500 optical layers or about 75 to 1000 optical layers. A film having a plurality of layers can include layers with different optical thicknesses to increase the reflectivity of the film over a range of wavelengths. For example, a film can include pairs of layers which are individually tuned (for normally incident light, for example) to achieve optimal reflection of light having particular wavelengths. It should further be appreciated that, although only a single multilayer stack may be described, the multilayer optical film can be made from multiple stacks that are subsequently combined to form the film. The described multilayer optical films can be made according to U.S. Ser. No. 09/229,724, which is incorporated herein by reference.

A polarizer can be made by combining a uniaxially-oriented first optical layer with a second optical layer having an isotropic index of refraction that is approximately equal to one of the in-plane indices of the oriented layer. Alternatively, both optical layers are formed from birefringent polymers and are oriented in a multiple draw process so that the indices of refraction in a single in-plane direction are approximately equal. The interface between the two optical layers forms a light reflection plane for one polarization of light. Light polarized in a plane parallel to the direction in which the indices of refraction of the two layers are approximately equal will be substantially transmitted. Light polarized in a plane parallel to the direction in which the two layers have different indices will be at least partially reflected. For polarizers having second optical layers with isotropic indices of refraction or low in-plane birefringence (e.g., no more than about 0.07), the in-plane indices ($n_x$ and $n_y$) of refraction of the second optical layers are approximately equal to one in-plane index (e.g., $n_y$) of the first optical layers. Thus, the in-plane birefringence of the first optical layers is an indicator of the reflectivity of the multilayer optical film. Typically, it is found that the higher the in-plane birefringence, the better the reflectivity of the multilayer optical film. If the out-of-plane indices ($n_z$) of refraction of the first and second optical layers are equal or nearly equal (e.g., no more than 0.1 difference and preferably no more than 0.05 difference), the multilayer optical film also has less off-angle color. Off-angle color arises from non-uniform transmission of light at angles other than normal to the plane of the multilayer optical film.

A mirror can be made using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices. One method of creating a uniaxially birefringent system is to biaxially orient (stretch along two axes) the multilayer polymeric film. If the adjoining layers have different stress-induced birefringence, biaxial orientation of the multilayer film results in differences between refractive indices of adjoining layers for planes parallel to both axes, resulting in the reflection of light of both planes of polarization. A uniaxially birefringent material can have either positive or negative uniaxial birefringence. Positive uniaxial birefringence occurs when the index of refraction in the z direction ($n_z$) is greater than the in-plane indices ($n_x$ and $n_y$). Negative uniaxial birefringence occurs when the index of refraction in the z direction ($n_z$) is less than the in-plane indices ($n_x$ and $n_y$). If $n_{1z}$ is selected to match $n_{2x}=n_{2y}=n_{2z}$ and the multilayer film is biaxially oriented, there is no Brewster's angle for p-polarized light and thus there is constant reflectivity for all angles of incidence. Multilayer films that are oriented in two mutually perpendicular in-plane axes are capable of reflecting an extraordinarily high percentage of incident light depending of the number of layers, f-ratio, indices of refraction, etc., and are highly efficient mirrors. Mirrors can also be made using a combination of uniaxially-oriented layers with in-plane indices of refraction which differ significantly.

Material Selection

The first optical layers are preferably birefringent polymer layers that are uniaxially- or biaxially-oriented. The first is capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film. The second optical layers can be polymer layers that are birefringent and uniaxially- or biaxially-oriented or the second optical layers can have an isotropic index of refraction which is different from at least one of the indices of refraction of the first optical layers after orientation. The second polymer advantageously develops little or no birefringence when stretched, or develops birefringence of the opposite sense (positive-negative or negative-positive), such that its film-plane refractive indices differ as much as possible from those of the first polymer in the finished film. For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymers to absorb specific wavelengths, either totally or in part.

The first and second optical layers and the optional non-optical layers of the multilayer optical film are composed of polymers such as, for example, polyesters. The term "polymer" will be understood to include homopolymers and copolymers, as well as polymers or copolymers that may be formed in a miscible blend, for example, by coextrusion or by reaction, including, for example, transesterification. The terms "polymer", "copolymer", and "copolyester" include both random and block copolymers Polyesters for use in the multilayer optical films of the present invention generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-diliydroxy biphenyl and isomers thereof; and 1,3-bis (2-hydroxyethoxy)benzene.

One polyester useful in the optical films of the present invention is polyethylene naphthalate (PEN), which can be made, for example, by reaction of naphthalene dicarboxylic acid with ethylene glycol. Polyethylene 2,6-naphthalate (PEN) is frequently chosen as a first polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Other semicrystalline naphthalene dicarboxylic polyesters suitable as first polymers include, for example, polybutylene 2,6-Naphthalate (PBN), polyethylene terephthalate (PET), and copolymers thereof.

Additional useful as first polymers are described, for example, in U.S. Ser. Nos. 09/229,724, 09/232,332, 09/399,531, and 09/444,756, which are incorporated herein by reference. One polyester that is useful as a first polymer is a coPEN derived with carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. The index of refraction is approximately 1.63. The polymer is herein referred to as low melt PEN (90/10). Another useful first polymer is a PET having an inherent viscosity of 0.74 dL/g, available from Eastman Chemical Company (Kingsport, Tenn.). Non-polyester polymers are also useful in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used.

The second polymer should be chosen so that in the finished film, the refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest. It will be understood from the foregoing discussion that the choice of a second polymer is dependent not only on the intended application of the multilayer optical film in question, but also on the choice made for the first polymer, as well as processing conditions.

The second optical layers can be made from a variety of second polymers having glass transition temperature compatible with that of the first polymer and having a refractive index similar to the isotropic refractive index of the first polymer. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Exemplary second polymers include homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomier units, or a blend of PMMA and poly(vinylidene fluoride) (PVDF) such as. that available from Solvay Polymers, Inc., Houston, Tex. under the trade designation Solef 1008.

Yet other second polymers include polyolefin copolymers such as poly (ethylene-co-octene) (PE-PO) available from Dow-Dupont Elastomers under the trade designation Engage 8200, poly (propylene-co-ethylene) (PPPE) available from Fina Oil and Chemical Co., Dallas, Tex., under the trade designation Z9470, and a copolymer of atatctic polypropylene (aPP) and isotatctic polypropylene (iPP) available from Huntsman Chemical Corp., Salt Lake City, Utah, under the trade designation Rexflex W111. Second optical layers can also be made from a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of mirrors include PET/PMMA or PET/coPMMA, PEN/PMMA or PEN/coPMMA, PET/ECDEL, PEN/ECDEL, PEN/sPS, PEN/THV, PEN/co-PET, and PET/sPS, where "co-PET" refers to a copolymer or blend based upon terephthalic acid (as described above), ECDEL is a thermoplastic polyester commercially available from Eastman Chemical Co., and THV is a fluoropolymer commercially available from 3M Co. PMMA refers to polymethyl methacrylate, coPET refers to a copolymer or blend based upon terephthalic acid (as described above), and PETG refers to a copolymer of PET employing a second glycol (usually cyclohexanedimethanol). sPS refers to syndiotactic polystyrene.

Non-Optical Layers

In addition to the first and second optical layers, the multilayer reflective film of the present invention optionally includes one or more non-optical layers such as, for example, one or more skin layers or one or more interior non-optical layers, such as, for example, protective boundary layers between packets of optical layers. Non-optical layers can be used to give the multilayer film structure or to protect it from harm or damage during or after processing. For some applications, it may be desirable to include sacrificial protective skins, wherein the interfacial adhesion between the skin layer(s) and the optical stack is controlled so that the skin layers can be stripped from the optical stack before use.

Materials may be chosen for the non-optical layers that impart or improve properties such as, for example, tear resistance, puncture resistance, toughness, weatherability, and solvent resistance of the multilayer optical body. Typically, one or more of the non-optical layers are placed so that at least a portion of the light to be transmitted, polarized, or reflected by the first and second optical layers also travels through these layers (i.e., these layers are placed in the path of light which travels through or is reflected by the first and second optical layers). The non-optical layers typically do not substantially affect the reflective properties of the optical films over the wavelength region of interest. Properties of the non-optical layers such as crystallinity and shrinkage characteristics need to be considered along with the properties of the optical layers to give the film of the present invention that does not crack or wrinkle when laminated to severely curved substrates.

The non-optical layers may be of any appropriate material and can be the same as one of the materials used in the optical stack. Of course, it is important that the material chosen not have optical properties deleterious to those of the optical stack. The non-optical layers may be formed from a variety of polymers, such as polyesters, including any of the polymers used in the first and second optical layers. In some embodiments, the material selected for the non-optical layers is similar to or the same as the material selected for the second optical layers. The use of coPEN, coPET, or other copolymer material for skin layers reduces the splittiness (i.e., the breaking apart of a film due to strain-induced crystallinity and alignment of a majority of the polymer molecules in the direction of orientation) of the multilayer optical film. The coPEN of the non-optical layers typically orients very little when stretched under the conditions used to orient the first optical layers, and so there is little strain-induced crystallinity.

Preferably, the polymers of the first optical layers, the second optical layers, and the optional non-optical layers are chosen to have similar rheological properties (e.g., melt viscosities) so that they can be co-extruded without flow disturbances. Typically, the second optical layers, skin layers, and optional other non-optical layers have a glass transition temperature, $T_g$, that is either below or no greater than about 40° C. above the glass transition temperature of the first optical layers. Preferably, the glass transition temperature of the second optical layers, skin layers, and optional non1 optical layers is below the glass transition temperature of the first optical layers. When length orientation (LO) rollers are used to orient the multilayer optical film, it may not be possible to use desired low $T_g$ skin materials, because the low $T_g$ material will stick to the rollers. If LO rollers are not used, then this limitation is not an issue. For some applications, preferred skin layer materials include PMMA and polycarbonate because of their durability and their ability to protect the optical stack from UV radiation.

The skin layers and other optional non-optical layers can be thicker than, thinner than, or the same thickness as the first and second optical layers. The thickness of the skin layers and optional non-optical layers is generally at least four times, typically at least 10 times, and can be at least 100 times, the thickness of at least one of the individual first and second optical layers. The thickness of the non-optical layers can be varied to make a multilayer reflective film having a particular thickness.

Additional coatings may also be considered non-optical layers. Other layers include, for example, antistatic coatings or films; flame retardants; UV stabilizers; abrasion resistant or hardcoat materials; optical coatings; anti-fogging materials, etc. Additional functional layers or coatings are described, for example, in WO 97/01440, WO 99/36262, and WO 99/36248, which are incorporated herein by reference. These functional components may be incorporated into one or more skin layers, or they may be applied as a separate film or coating.

Other polymeric optical films are suitable for use with the invention. In particular, the invention is suited for use with polymeric films that show excessive warping upon exposure to temperature variation. The optical films are typically thin. Suitable films include films of varying thickness, but particularly films less than 15 mils thick, more typically less than 10 mils thick, and preferably less than 7 mils thick. During processing, the dimensionally stable layer is extrusion coated onto the optical film at temperatures exceeding 250° C. Therefore, the optical film preferably withstands exposure to temperatures greater than 250° C., and more preferably withstands temperatures greater than 250° C. The optical film also normally undergoes various bonding and rolling steps during processing, and therefore the film should be flexible.

B. Dimensionally Stable Layer

The dimensionally stable layer provides resistance to irregular warping of the optical film, while typically producing a flexible optical body that is not fragile. The dimensionally stable layer is typically sufficiently flexible such that the optical body can be bent or rolled, yet still provides sufficient stability to avoid irregular warping. In this regard, the dimensionally stable layer resists forming wrinkles and waves in the optical body, while still allowing easy handling and storage of the optical body, such as by being retained on a roll.

Although the composite optical body avoids warping, extreme temperature ranges, particularly high temperatures, can result in deterioration of the optical body. The dimensionally stable layer typically permits an optical film to be repeatedly cycled through a temperature of −30° C. to 85° C. every 1.5 hours for 400 hours without warping, or only insignificant warping. In contrast, the optical film alone without the dimensionally stable layer shows warping under these same circumstances. In addition, the optical film alone without the dimensionally stable layer exhibits warping when cycled from room temperature to 60° C. and 70 percent relative humidity.

The dimensionally stable layer is normally transparent or substantially transparent. In implementations where high reflectivity of the optical body is desired, it is particularly important that exposed dimensionally stable layers be highly transparent. In addition, in order to avoid undesirable light shifts, the index of refraction of the dimensionally stable layer can be made such that it is close to the index of refraction of the optical film (or of any intermediate layers).

The polymer composition of the dimensionally stable layer is preferably selected such that it can be extruded, remains transparent after processing at high temperatures, and is substantially stable at temperatures from at least about −30° C. to 85° C. The dimensionally stable layer is normally flexible, but does not significantly expand in length or width over the temperature range of −30° C. to 85° C. To the extent that the dimensionally stable layer does expand over this temperature range, the expansion is substantially uniform such that the film does not show excessive wrinkling.

The dimensionally stable layer is typically a polymeric material exhibiting a glass transition temperature ($T_g$) from 85 to 200° C., more typically from 100 to 160° C. The thickness of the dimensionally stabile layer can vary depending upon the application. However, the dimensionally stable layer is typically from 0.5 to 10 mils thick, more typically from 1 to 8 mils thick, and even more typically from 1.5 to 7 mils thick.

Suitable dimensionally stable layers can include polycarbonate or miscible blends of polycarbonate and PEN, CoPEN, PET, and CoPET. In other implementations the dimensionally stable layer comprises polystyrene or polystyrene copolymers, including styrene acrylonitrile, acrylonitrile butadiene styrene, and styrene methyl methacrylate. Specific compositions include Lexan 121 polycarbonate from GE Polymers, Lexan HF1110 polycarbonate from GE Polymers, Calibre 5101 glass filed polycarbonate from Dow Corporation, and Tyril 880b styrene acrylonitrile from Dow Corporation.

The dimensionally stable layer can be formed such that it diffuses light. The diffusion property can be accomplished by using an inherently diffuse polymeric material, or by embossing a diffuse pattern onto the dimensionally stable layer during manufacture. The embossed pattern can also re-direct light from angles far from normal to the film towards angles which are closer to normal from the film. Diffusion in the dimensionally stable layer can also be accomplished by incorporation of small particles with refractive indices differing from that of the dimensionally stable layer. In addition, elastomeric components such as butadiene, and ethylene propylene dimethacrylates or other rubber like particles can be incorporated into the dimensionally stable layer to enhance diffusivity. This diffusivity can aid in concealing imperfections or irregularities in the various layers of the optical body.

The optical bodies having enhanced diffusivity can also be accomplished by blending CoPEN or CoPET with the dimensionally stable material at low levels to provide diffusion. In addition, the CoPEN or CoPET can aid in the adhesion of optical films that contain CoPEN or CoPET to the dimensionally stable layer. Optionally, such compositions can be used as the intermediate layer in order to increase diffusion as well as to help retain the layers together. Typically, such CoPEN or CoPET is added at levels of approximately 1 to 30 percent of the dimensionally stable material, more typically at 5 to 20 percent.

The dimensionally stable layer is typically added to both sides of the optical film. However, in some implementations the dimensionally stable layer is added to just one side of the optical film in order to encourage curling of the film, such as for making an optical body that will wrap around a fluorescent light tube.

C. Intermediate Layer

The optical body can also optionally include one or more layers in addition to the optical film and the dimensionally stable layer or layers. When one or more additional layers are present, they typically function to improve the integrity of the composite optical body. In particular, the layers can serve to bind the optical film to the dimensionally stable layer. In certain implementations the dimensionally stable layer and the optical film will not form a strong bond directly to one another. In such implementations, an intermediate layer to adhere them together is necessary.

The composition of the intermediate layers is typically chosen in order to be compatible with the optical film and the dimensionally stable layer that they contact. The intermediate layers should bind well to both the optical film and the dimensionally stable layer. Therefore, the choice of the material used in the intermediate layer will often vary depending upon the composition of the other components of the optical body.

In specific implementations the intermediate layer is an extrudable transparent hot melt adhesive. Such layers can include CoPENs containing one or more of naphthalene dicarboxylic acid (NDC), dimethyl terepthalate (DMT), hexane diol (HD), trimethylol propane (TMP), and ethylene glycol (EG). Layers that contain NDC are particularly well suited to adhering to the dimensionally stable layer to optical films containing PENs and CoPENs. In such implementations, the intermediate layer typically contains from 20 to 80 parts NDC, preferably 30 to 70 parts NDC, and more preferably 40 to 60 parts NDC. Various additional compounds can be added, including the comonomers previously listed in the optical film. Extrusion aids such as plasticizers and lubricants can be added for improved processing and adhesion to other layers. Also, particles such as inorganic spheres or polymer beads with a different refractive index from the adhesive polymer can be used.

In certain implementations, an intermediate layer is integrally formed with the optical film, the dimensionally stable layer, or both. The intermediate layer can be integrally formed with the optical film by being a skin coat on the exposed surfaces of the optical film. The skin coat typically is formed by being co-extruded with the optical film in order to integrally form and bind the layers. Such skin coats are selected so as to improve the ability to bind subsequent layers to the optical film. Skin coats are particularly useful when the optical film would otherwise have a very low affinity to the specific dimensionally stable layer that is being used, such as polycarbonates. In such cases, miscible blends of CoPEN and polycarbonate or PET and polycarbonate can be extruded as skin layers. Similarly, an intermediate layer can be integrally formed with the dimensionally stable layer by being simultaneously co-extruded or sequentially extruded onto the optical film. In yet other implementations of the invention, a skin layer can be formed on the optical film and another intermediate layer can be formed with the dimensionally stable layer.

The intermediate layer or layers are preferably thermally stable in a melt phase at temperatures above 250° C. Thus, the intermediate layer does not substantially degrade during extrusion at temperatures greater than 250° C. The intermediate layer is normally transparent or substantially transparent so as to avoid reducing the optical properties of the film. The intermediate layer is typically less than 2 mils thick, more typically less than 1 mil thick, and even more typically about 0.5 mil thick. The thickness of the intermediate layer is preferably minimized in order to maintain a thin optical body.

D. Methods and Systems

Various methods may be used for forming the composite optical body of the present invention. As stated above, the optical bodies can take on various configurations, and thus the methods vary depending upon the configuration of the final optical body.

A step common to all methods of forming the composite optical body is adhering the optical film to the dimensionally stable layer or layers. This step can be conducted in a variety of ways, such as co-extruding various layers, extrusion coating the layers, or coextrusion coating of the layers (such as when a dimensionally stable layer and an intermediate layer are simultaneously extrusion coated onto the optical film).

Figure 4:
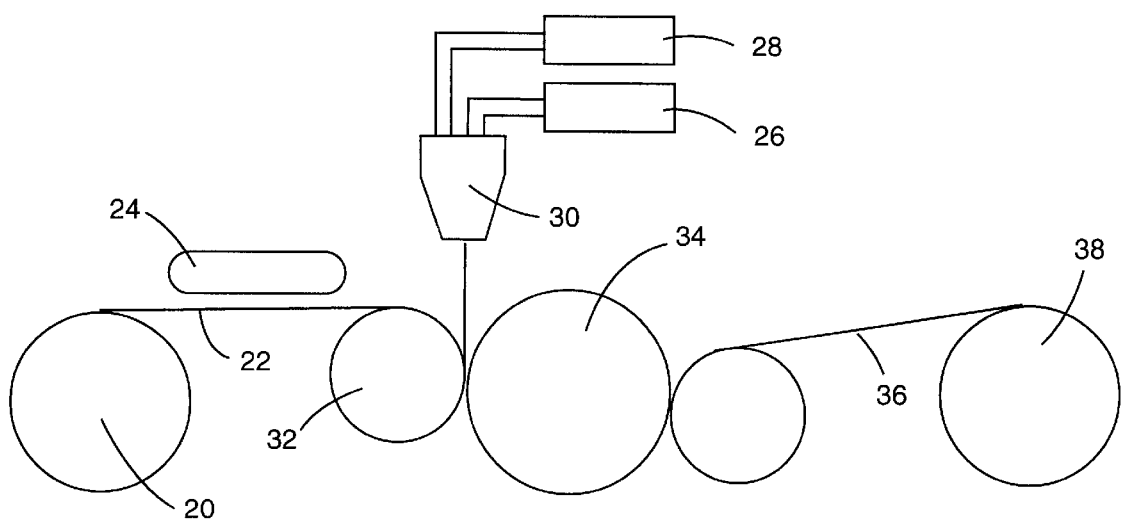
FIG. 4 is a plan view of a system for forming an optical body in accordance with an implementation of the invention.

FIG. 4 shows a plan view of a system for forming an optical body in accordance with one implementation of the invention. Spool 20 containing optical film 22 is unwound and heated at infrared heating station 24. Optical film 22 is normally raised to a temperature above 50° C., and more commonly to a temperature of approximately 65° C. Composition 26 for forming a dimensionally stable layer and composition 28 for forming an intermediate adhesive layer are fed through feed block 30 and coextrusion coated onto the preheated optical film 22. Thereafter, the optical film is pressed between rolls 32, 34. Roll 32 and/or roll 34 optionally contain a matte-finish to impart a slightly diffuse surface on the dimensionally stable layer. After cooling, the coated optical film 36 can be subsequently processed, such as by cutting into sheets, to form a finished optical body that is rolled onto winder 38.

The extruded film can be oriented by stretching individual sheets of the optical body material in heated air. For economical production, stretching may be accomplished on a continuous basis in a standard length orienter, tenter oven, or both. Economies of scale and line speeds of standard polymer film production may be achieved thereby achieving manufacturing costs that are substantially lower than costs associated with commercially available absorptive polarizers.

To make a mirror, two uniaxially stretched polarizing sheets are positioned with their respective orientation axes rotated 90° C., or the sheet is biaxially stretched. Biaxially stretching the multilayered sheet will result in differences between refractive indices of adjoining layers for planes parallel to both axes thereby resulting in reflection of light in both planes of polarization directions.

One method of creating a birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization. Specific methods and materials are taught in PCT patent application WO 99/36812 entitled "An Optical Film and Process for Manufacture Thereof", incorporated herein by reference in its entirety.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratios in the range from 1:2 to 1:10 (more preferably 1:3 to 1:7) in the stretch direction and from 1:0.5 to 1:10 (more preferably from 1:0.5 to 1:7) orthogonal to the stretch direction is preferred.

E. EXAMPLES

The invention will now be illustrated by reference to the following examples.

Example 1

A multi-layer reflective polarizer containing PEN and CoPEN (containing 55 molar parts NDC and 45 molar parts DMT) layers with two CoPEN skin layers (containing 55 molar parts NDC and 45 molar parts DMT as carboxylate components) was preheated to 65° C. with infrared heat and then fed into a nip roll at 7.5 feet per minute. A coextruded CoPEN adhesive layer and a high Tg polycarbonate melt layer were extrusion coated onto the multi-layer reflective polarizer. The CoPEN adhesive layer contained 20 molar parts NDC, 80 molar parts DMT, 4 molar parts HD, 0.2 molar parts TMP, and 95.8 molar parts EG. The high $T_g$ melt layer contained Lexan 121 polycarbonate from GE Polymers. These polymers were coextruded at 271° C., with the CoPEN adhesive layer maintained at 0.5 mil thickness and the polycarbonate at 6 mil thickness. The polarizer with extrusion coated layers were pressed against a casting wheel that had a 150 rms matte finish and was heated to 83° C., used to emboss the polycarbonate with a diffuse surface. The same process was repeated to apply an adhesive layer and polycarbonate layer on the opposite side of the optical film. The sample was placed in an oven, and cycled form –30° C. to 85° C. every 1.5 hours for 400 hours with no apparent warping.

Example 2

A multi-layer reflective polarizer containing PEN and CoPEN (containing 55 molar parts NDC and 45 molar parts DMT) layers with two CoPEN skin layers (containing 55 molar parts DMT and 45 molar parts NDC) was preheated to 65° C. with infrared heat and then fed into a nip roll at 7.5 feet per minute. A coextruded CoPEN adhesive layer and a high Tg styrene acrylonitrile melt layer were extrusion coated onto the mutlt-layer reflective polarizer. The CoPEN adhesive layer contained 20 molar parts NDC, 80 molar parts DMT, 4 molar parts HD, 0.2 molar parts TMP, and 95.8 molar parts EG. The high $T_g$ melt layer contained Tyril 880$b$ styrene acrylonitrile form DOW Corporation. These polymers were coextruded at 271° C., with the CoPEN adhesive layer maintained at 0.5 mil thickness and the styrene acrylonitrile at 6 mil thickness. The polarizer with extrusion coated layers were pressed against a casting wheel that had a 150 rms matte finish and was heated to 83° C., used to emboss the styrene acrylonitrile with a diffuse surface. The same process was repeated to apply an adhesive layer and styrene acrylonitrile layer on the opposite side of the optical film. The sample was placed in an oven, and cycled form –30° C. to 85° C. every 1.5 hours for 400 hours with no apparent warping.

Example 3

A multi-layer reflective polarizer containing PEN and CoPEN (containing 55 molar parts NDC and 45 molar parts DMT) layers with two CoPEN skin layers (containing 55 molar parts DMT and 45 molar parts NDC) was preheated to 65° C. with infrared heat and then fed into a nip roll at 7.5 feet per minute. A coextruded CoPEN adhesive layer and a high Tg styrene acrylonitrile melt layer were extrusion coated onto the mutlt-layer reflective polarizer. The CoPEN adhesive layer contained 55 molar parts NDC, 45 molar parts DMT, 4 molar parts HD, 0.2 molar parts TMP, and 95.8 molar parts EG. The high $T_g$ melt layer contained Tyril 880$b$ styrene acrylonitrile form DOW Corporation. These polymers were coextruded at 271° C., with the CoPEN adhesive layer maintained at 0.5 mil thickness and the styrene acrylonitrile at 6 mil thickness. The polarizer with extrusion coated layers were pressed against a casting wheel that had a 150 rms matte finish and was heated to 83° C., used to emboss the styrene acrylonitrile with a diffuse surface. The same process was repeated to apply an adhesive layer and styrene acrylonitrile layer on the opposite side of the optical film. The sample was placed in an oven, and cycled form –30° C. to 85° C. every 1.5 hours for 400 hours with no apparent warping.

Example 4

A multi-layer reflective polarizer containing PEN and CoPEN (containing 55 molar parts NDC and 45 molar parts DMT) layers with two CoPEN skin layers (containing 55 molar parts DMT and 45 molar parts NDC) was preheated to 65° C. with infrared heat and then fed into a nip roll at 7.5 feet per minute. A coextruded CoPEN adhesive layer and a high Tg polycarbonate melt layer were extrusion coated onto the mutlt-layer reflective polarizer. The CoPEN adhesive layer contained 20 molar parts NDC, 80 molar parts DMT, 4 molar parts HD, 0.2 molar parts TMP, and 95.8 molar parts EG. The CoPEN adhesive layer further included 10 weight percent X273 zeeeospheres from Zeelan Industries to increase diffusion of the optical body. The high $T_g$ melt layer contained Lexan 121 polycarbonate from GE Polymers. These polymers were coextruded at 271° C., with the CoPEN adhesive layer maintained at 0.5 mil thickness and the polycarbonate at 6 mil thickness. The polarizer with extrusion coated layers were pressed against a casting wheel that had a 150 rms matte finish and was heated to 83° C., used to emboss the polycarbonate with a diffuse surface. The same process was repeated to apply an adhesive layer and polycarbonate layer on the opposite side of the optical film, with the exception that the zeeospheres were not added to the adhesive layer. The sample was placed in an oven, and cycled form −30° C. to 85° C. every 1.5 hours for 400 hours with no apparent warping.

Although the present invention has been described with reference to preferred embodiments, those of skill in the art will recognize that changes may be made in form and detail without departing from the spirit and scope of the invention.

What is claimed is:

1. A multilayer optical body comprising:
    an optical film;
    an extrudable thermoplastic polymeric layer secured to the optical film; and
    a flexible, dimensionally stable layer secured to the polymeric layer, wherein the dimensionally stable layer comprises polystyrene or a polystyrene copolymer and the dimensionally stable layer is configured and arranged to permit cycling the optical body through temperatures of −30° C. and 85° C. every 1.5 hours for 400 hours without warping.

2. The mutlilayer optical body of claim 1, wherein the optical film comprises an oriented optical film.

3. The multilayer optical body of claim 2, wherein the optical film is oriented independently of the polymeric layer and dimensionally stable layer.

4. The multilayer optical body of claim 2, wherein the optical film is oriented simultaneously with the polymeric layer and dimensionally stable layer.

5. The multilayer optical body of claim 1, wherein the optical film comprises multiple layers.

6. The multilayer optical body of claim 5, wherein at least one layer of the optical film comprises polyester.

7. The multilayer optical body of claim 6, wherein the polyester is selected from the group consisting of CoPEN and CoPET.

8. The multilayer optical body of claim 1, wherein the polymeric layer is thermally stable in the melt phase at a temperature above 250° C.

9. The multilayer optical body of claim 1, wherein the polymeric layer comprises polyester.

10. The multilayer optical body of claim 9, wherein the polymeric layer comprises CoPEN, CoPET, or combinations thereof.

11. The multilayer optical body of claim 1, wherein the polymeric layer is transparent.

12. The multilayer optical body of claim 1, wherein the polymeric layer has a refractive index from 1.55 to 1.62.

13. The multilayer optical body of claim 1, wherein the polymeric layer has a refractive index within 0.06 of the refractive index of the dimensionally stable layer.

14. The multilayer optical body of claim 1, wherein the polymeric layer has a refractive index between the refractive index of the optical film and the dimensionally stable layer.

15. The multilayer optical body of claim 1, wherein the polystyrene copolymer is selected from the group styrene acrylonitrile, styrene methyl methacrylate, acrylonitrile butadiene styrene, and combinations thereof.

16. The mutlilayer optical body of claim 1, wherein dimensionally stable layer is formed by extrusion.

17. The multilayer optical body of claim 16, wherein the dimensionally stable layer and polymeric layer are formed by coextrusion onto the optical film.

18. The multilayer optical body of claim 1, wherein the dimensionally stable layer has a thickness in the range of 0.5 to 10 mils.

19. The multilayer optical body of claim 1, wherein the dimensionally stable layer comprises the copolymer of polystyrene and the copolymer of polystyrene comprises butadiene monomer units.

20. The multilayer optical body of claim 1, wherein the dimensionally stable layer is configured and arranged to diffuse light passing through the dimensionally stable layer.

21. The multilayer optical body of claim 1, wherein dimensionally stable layer a comprises a surface configured and arranged in a diffuse pattern.

22. The multilayer optical body of claim 1, wherein the surface of the dimensionally stable layer is embossed to form a diffuse pattern.

23. A multilayer optical body comprising:
    an oriented optical film; and
    a dimensionally stable layer comprising an acrylonitrile butadiene styrene copolymer.

24. The multilayer optical body of claim 23, wherein the optical film comprises multiple layers.

25. The multilayer optical body of claim 24, wherein at least one layer of the optical film comprises polyester.

26. The multilayer optical body of claim 25, wherein the polyester is selected from the group consisting of PEN, CoPEN, PET, CoPET, and combinations thereof.

27. The multilayer optical body of claim 23, wherein the optical film comprises multiple alternating layers comprising PEN and CoPEN.

28. The multilayer optical body of claim 20, further comprising:
    a polymeric layer secured to the optical film, the polymeric layer having a glass transition temperature greater than 80° C.

29. The multilayer optical body of claim 28, wherein the polymeric layer comprises polyester.

30. The multilayer optical body of claim 28, wherein the polymeric layer comprises CoPEN containing naphthalene dicarboxylic acid, and dimethyl terepthalate.

31. The multilayer optical body of claim 28, wherein the polymeric layer has a refractive index of 1.56 to 1.62.

32. The multilayer optical body of claim 28, wherein the polymeric layer has a refractive index within 0.06 of the refractive index of the dimensionally stable layer.

33. The multilayer optical body of claim 28, wherein the polymeric layer has a refractive index between the refractive index of the optical film and the dimensionally stable layer.

34. The multilayer optical body of claim 23, wherein the dimensionally stable layer has a thickness in the range of 0.5 to 10 mils.

35. The multilayer optical body of claim 23, wherein the dimensionally stable layer is configured and arranged to diffuse light passing through the dimensionally stable layer.

36. The multilayer optical body of claim 23, wherein dimensionally stable layer comprises a surface configured and arranged in a diffuse pattern.

37. The multilayer optical body of claim 23, wherein the surface of the dimensionally stable layer is embossed to form a diffuse pattern.

38. A method of forming a warp-resistant optical body, the method comprising:
    providing a first film comprising an optical film;
    forming a second film comprising a thermoplastic polymeric material having a glass transition temperature greater than 85° C.;
    forming a third film, wherein the third film comprises a dimensionally stable layer that comprises an acrylonitrile butadiene styrene copolymer; and adhering the first film to the second film, and the second film to the third film, to form a dimensionally stable optical body.

39. The method of claim 38, wherein the optical film is an oriented optical film.

40. The method of claim 38, further comprising orienting the optical film prior to forming the second film and third film.

41. The method of claim 38, further comprising orienting the optical film after forming the second film and third film.

42. The method of claim 38, wherein the second film and third film are extruded.

43. The method of claim 42, wherein the second film and third film are coextruded.

44. The method of claim 38, wherein the optical film comprises multiple layers.

45. The method of claim 44, wherein at least one layer of the optical film comprises polyester.

46. The method of claim 38, wherein the second film comprises polyester.

47. The method of claim 38, wherein the second film comprises a polymeric material selected from the group consisting of CoPEN, CoPET, and combinations thereof.

48. The method of claimn 38, further comprising forming a diffuse pattern on at least a portion of a surface of the dimensionally stable layer of the third film.

49. The method of claim 48, wherein forming a diffuse pattern comprises embossing the portion of the surface of the dimensionally stable layer of the third film to form the diffuse pattern.

50. A method of forming a warp-resistant optical body, the method comprising:
   providing an optical film; and
   coating the optical film by coextruding a thermoplastic polymeric layer and a dimensionally stable layer onto the optical film, wherein the dimensionally stable layer comprises polystyrene or a polystyrene copolymer and the dimensionally stable layer is configured and arranged to permit cycling of the optical body through temperatures of −30° C. and 85° C. every 1.5 hours for 400 hours without warping.

51. The method of claim 50, further comprising orienting the optical film.

52. The method of claim 51, wherein the optical film is oriented prior to coating the film with the thermoplastic polymeric layer and the dimensionally stable layer.

53. The method of claim 50, wherein the thermoplastic polymeric layer comprises a polymeric material selected from CoPEN, CoPET, and combinations thereof.

54. The method of claim 50, further comprising forming a diffuse pattern on at least a portion of a surface of the dimensionally stable layer.

55. The method of claim 54, wherein forming a diffuse pattern comprises embossing the portion of the surface of the dimensionally stable layerto form the diffuse pattern.

56. The method of claim 50, wherein the dimensionally stable layer further comprises a polyester material selected from CoPEN, CoPET, and combinations thereof.

57. The method of clain 56, wherein the dimensionally stable layer comprises 1 to 30 wt. % of the polyester material.

58. A method of forming a warp-resistant optical body, the method comprising:
   providing an optical film; and
   securing a dimensionally stable layer to the optical film, wherein the dimensionally stable layer comprises polystyrene or a polystyrene copolymer and the dimensionally stable layer is configured and arranged to permit cycling of the optical body through temperatures of −30° C. and 85° C. every 1.5 hours for 400 hours without warping.

59. The method of claim 58, wherein securing the dimensionally stable layer to the optical film comprises coextruding the dimensionally stable layer with the optical film.

60. The method of claim 58, wherein securing the dimensionally stable layer to the optical film comprises securing an extrudable thermoplastic polymeric layer to the optical film and securing the dimensionally stable layer to the extrudable thermoplastic polymeric layer.

61. The method of claim 60, wherein securing the extrudable thermoplastic polymeric layer to the optical film and securing the dimensionally stable layer to the extrudable thermoplastic polymeric layer comprise coextruding the extrudable thermoplastic polymer layer and dimensionally stable layer onto the optical film.

62. The method of claim 58, further comprising forming a diffuse pattern on at least a portion of a surface of the dimensionally stable layer.

63. The method of claim 62, wherein forming a diffuse pattern comprises embossing the portion of the surface of the dimensionally stable layer that to form the diffuse layer.

64. A multilayer optical body comprising:
   an optical film; and
   a flexible, dimensionally stable layer disposed on the optical film, wherein the dimensionally stable layer comprises a dimensionally stable material selected from polystyrene and polystyrene copolymers blended with a polyester material selected from CoPEN, CoPET, or combinations thereof.

65. The multilayer optical body of claim 64, wherein the dimensionally stable layer comprises 1 to 30 wt. % of the polyester material.

66. The multilayer optical body of claim 65, wherein the dimensionally stable layer comprises 5 to 20 wt. % of the polyester material.

* * * * *

UNITED STATES PATENT AND TRADEMARK OFFICE
CERTIFICATE OF CORRECTION

PATENT NO. : 6,673,425 B1
DATED : January 6, 2004
INVENTOR(S) : Hebrink, Timothy J.

It is certified that error appears in the above-identified patent and that said Letters Patent is hereby corrected as shown below:

Column 6,
Line 9, insert -- . -- following the "copolymers".

Column 7,
Line 56, delete "." following "as".

Column 9,
Line 19, delete "non1 optical" and insert -- non-optical --.

Column 14,
Line 4, delete "mutlt-layer" and insert -- multi-layer --.
Line 8, delete "form" and insert -- from --.

Column 15,
Line 2, delete "polycarbo nate" and insert -- polycarbonate --.

Column 16,
Line 28, delete "20" and insert -- 23 --.

Column 17,
Line 15, delete "38" and insert -- 44 --.
Line 24, delete "claimn" and insert -- claim --.
Line 55, delete "layerto" and insert -- layer to --.

Signed and Sealed this

Twenty-fifth Day of May, 2004

JON W. DUDAS
*Acting Director of the United States Patent and Trademark Office*